United States Patent [19]

O'Brien et al.

[11] 3,998,110
[45] Dec. 21, 1976

[54] FOUR-SPEED MANUAL TRANSMISSION CONTROL TRANSMISSION SHIFT LEVER WITH DETENT INHIBITOR

[75] Inventors: Patrick H. O'Brien, Birmingham; Rizal J. Baysa, Washington, both of Mich.

[73] Assignee: General Motors Corporation, Detroit, Mich.

[22] Filed: Sept. 15, 1975

[21] Appl. No.: 613,330

[52] U.S. Cl. ............................... 74/476; 74/473 R
[51] Int. Cl.² ..................... G05G 5/02; G05G 9/12
[58] Field of Search ................. 74/473 R, 476, 477

[56] References Cited
UNITED STATES PATENTS

| | | | |
|---|---|---|---|
| 1,415,200 | 5/1922 | Sherbondy | 74/473 R |
| 1,898,140 | 2/1933 | Peterson | 74/476 |
| 1,909,889 | 5/1933 | Peterson | 74/476 |
| 2,040,594 | 5/1936 | Bixby | 74/476 X |
| 3,082,638 | 3/1963 | Nilson | 74/473 R |
| 3,213,705 | 10/1965 | McQueen | 74/476 |
| 3,264,893 | 8/1966 | Stott et al. | 74/477 |
| 3,410,150 | 11/1968 | Wieland et al. | 74/476 |
| 3,597,992 | 8/1971 | Lowry | 74/476 |

Primary Examiner—Allan D. Herrmann
Attorney, Agent, or Firm—A. M. Heiter

[57] ABSTRACT

A transmission shift linkage having a manual shift lever pivoted in a housing for selecting movement between neutral positions and shifting movement to four forward speed positions and a reverse drive position with a manually releasable reverse inhibitor to prevent selecting movement from the neutral position for first and second speed drive position to the neutral position for reverse drive position to inhibit shifts to reverse drive position. The inhibitor has a stop member mounted on the manual shift lever for movement in the selecting movement direction between inhibiting and detent positions and is spring biased to inhibiting position. A spring biased finger operated release mechanism normally locks the stop member in inhibiting position for engaging the housing to positively inhibit selecting movement from the first second neutral position to the reverse neutral position to inhibit a shift to reverse and on manual release of the release mechanism to permit movement of the stop member against the inhibitor spring bias for manual detent feel selecting movement of the shift lever from the first second neutral position to the reverse neutral position to permit a shift to reverse.

5 Claims, 7 Drawing Figures

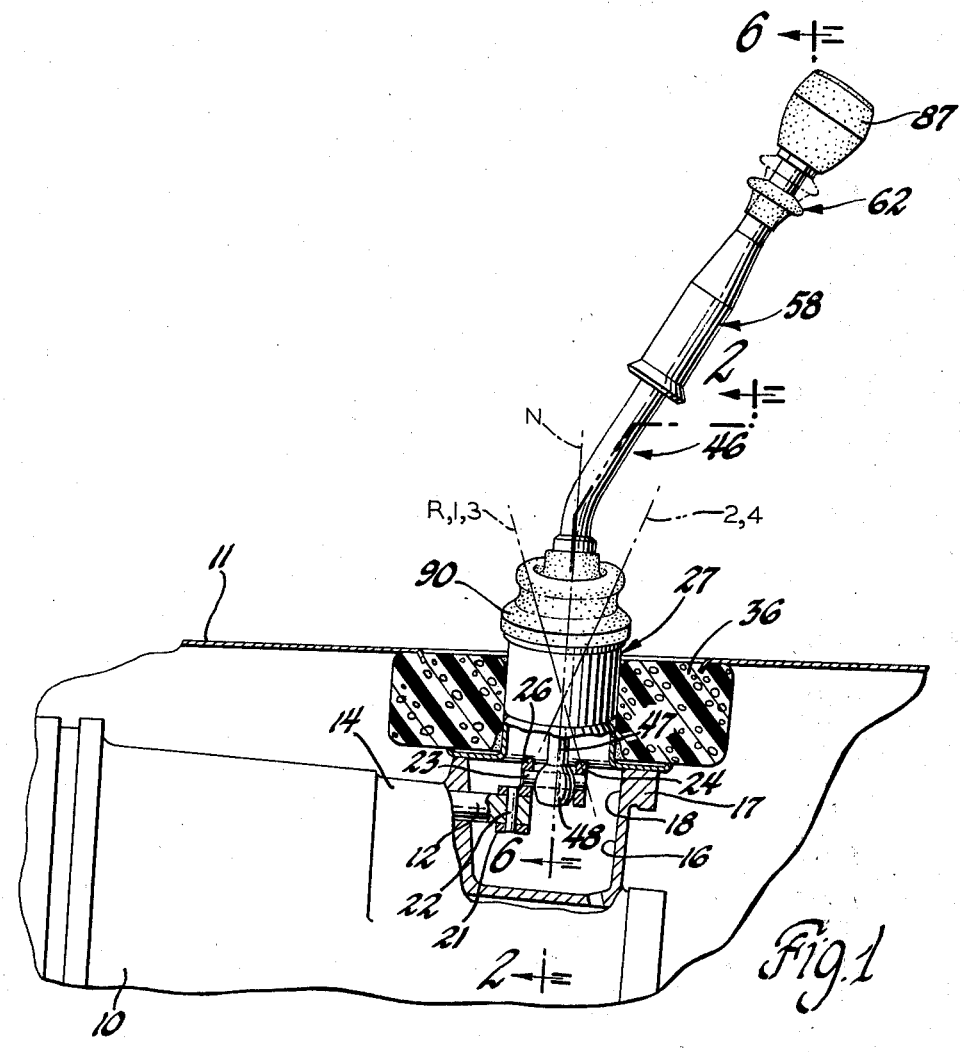
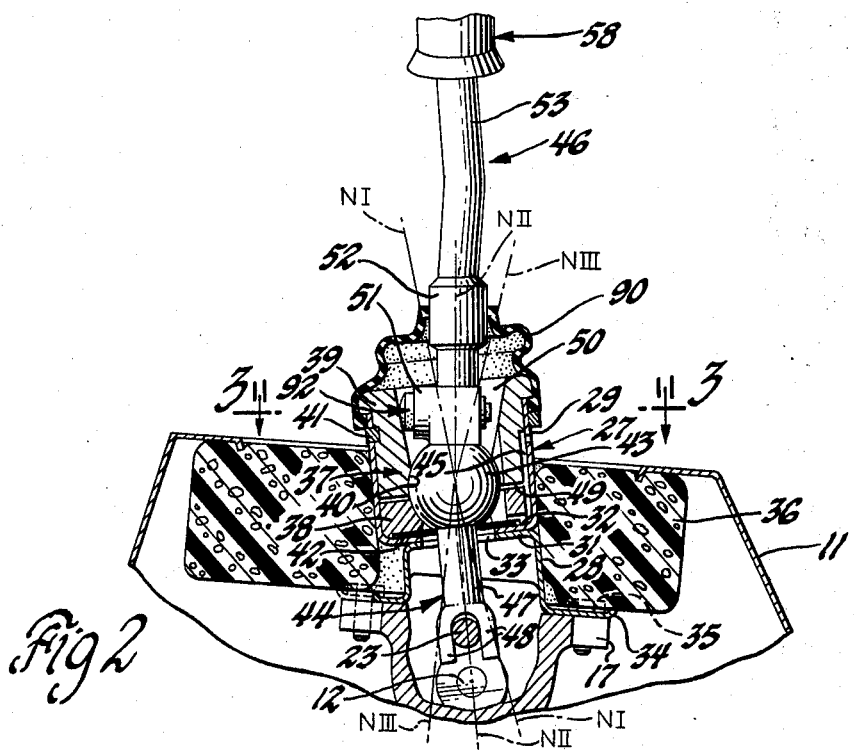

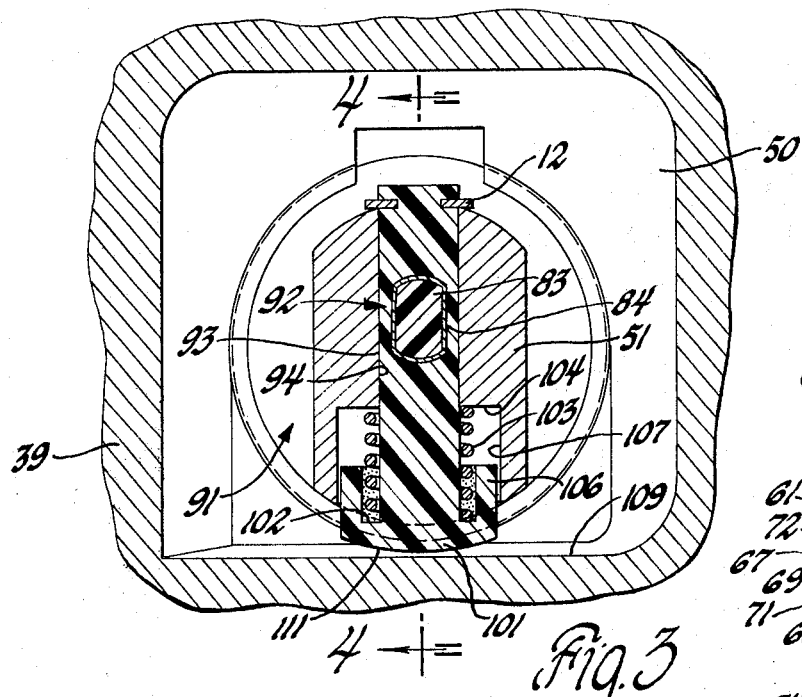
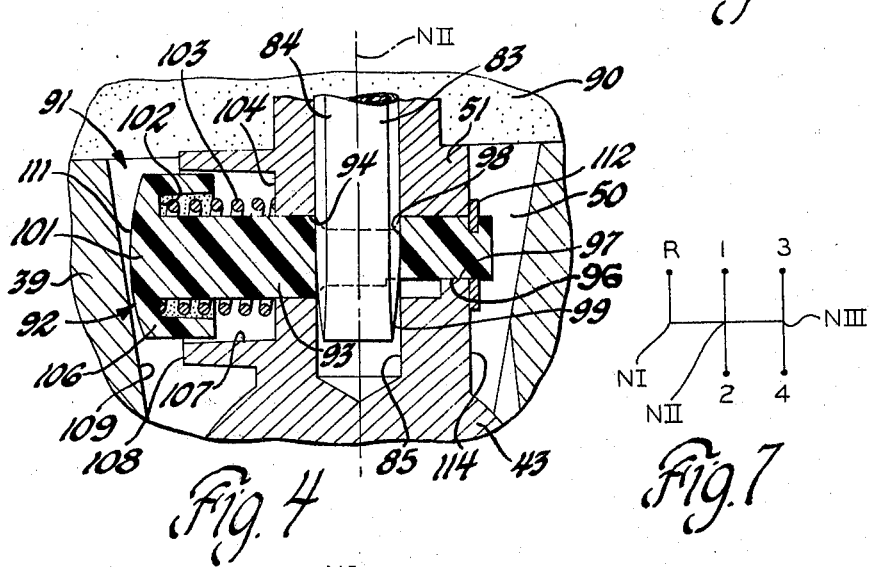
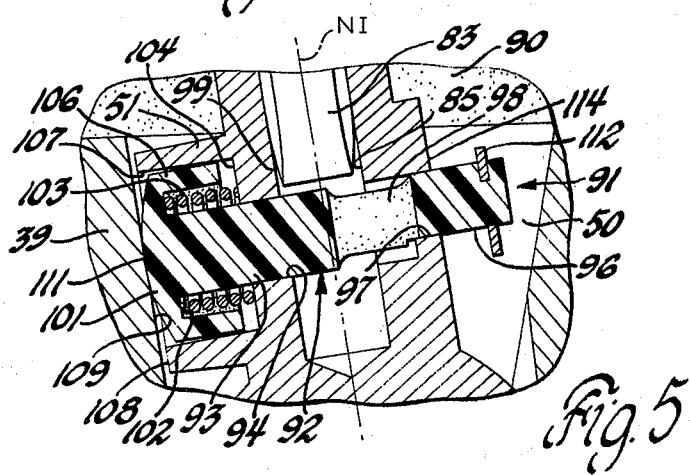
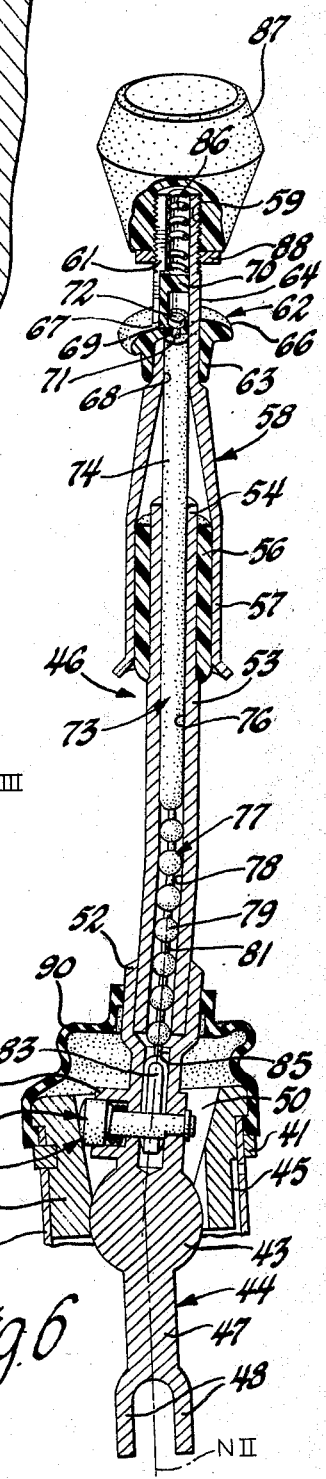

TRANSMISSION SHIFT LEVER WITH DETENT INHIBITOR

This invention relates to transmission shift control linkages and particularly to a manual control having a reverse shift inhibitor.

SUMMARY OF THE INVENTION

This manual shift control linkage for a transmission has a reverse shift inhibitor mounted on the manual shift lever for transverse movement in the direction of the shift lever selecting movement between an inhibiting position and a non-inhibiting position. The inhibitor mechanism is normally biased to the inhibiting position and a locking mechanism normally biased to locking position positively locks the inhibitor in inhibiting position in which the inhibitor engages a fixed stop and prevents a shift of the shift lever from the neutral position for forward speed drives to the neutral position for reverse drive and thus a shift to reverse. On manual release of the release mechanism the shift lever may be manually moved against the bias of the inhibitor from the neutral position for forward speed drives to the neutral position for reverse drive for a shift to reverse drive. During the manual shift of the shift lever to the reverse neutral position, the inhibitor bias provides operator feel, resistance to this shift, to advise the operator that he is shifting to reverse. On a shift of the shift lever from reverse drive position to reverse neutral position, the inhibitor bias will automatically return the shift lever to the neutral position for forward drives and the locking mechanism will automatically lock the inhibitor in inhibiting position to limit shifting to forward drives.

This external shift linkage is used to control a conventional manual transmission having an internal linkage having selecting movement between first, second and third neutral positions and shifting movement from the first, the reverse, neutral position to reverse drive position and from the second and third, the forward, neutral positions respectively to first or second and to third or fourth drive positions. These internal linkages have detent and stop devices determining these positions. The manual shift lever is pivoted intermediate its length to a support housing and connected at the lower end to the internal linkage so the upper hand knob portion has similar movement but the first and third neutral positions are on opposite sides of the second neutral position and the shift positions are on opposite sides of the neutral positions. The inhibitor mechanism is mounted on the shift lever and cooperates with a stop portion on the support housing. The inhibitor mechanism has an inhibitor member mounted in a transverse bore in said shift lever for reciprocating movement in the selecting movement direction which is spring biased to an inhibiting position determined by motion stops on the inhibitor member and shift lever and movable from the inhibiting position by movement of the shift member in contact with a stop surface on the support housing to the non-inhibiting position. A locking mechanism has a finger release on the outside surface of the shift lever connected to a rod reciprocally mounted in a longitudinal bore in the shift lever. A locking biasing spring biases the finger release and rod so the lower end of the rod enters a locking opening in the inhibitor member only when the inhibiting member is in inhibiting position to positively lock the inhibitor member in inhibiting position. Guide means between the inhibitor member and shift lever align the locking opening with the bore in the shift lever for easy entry of the rod by its biasing spring into the locking opening. Manually lifting the finger release lifts the rod out of the locking opening to release the inhibitor member. The rod is made of flexible plastic material and in the curved portion of the handle has a series of balls connected by thin flexible links to provide sufficient flexibility so the rod may be moved easily through the curved portion of the bore. When the shift lever is in either forward neutral position, the second and third neutral positions or any forward drive position, first through fourth forward drive position, the inhibitor member is biased to inhibiting position and the locking member is normally biased to locking position permitting shifting between forward drives and preventing shifting to first neutral position for a shift to reverse. To make a shift to reverse the operator lifts the finger release and rod to release the inhibitor member and moves the shift lever from second neutral position to first neutral position compressing the inhibitor biasing spring which provides a resistance force indicating this shift and then may shift to reverse. On shifting out of reverse to first neutral position, the inhibitor biasing spring returns the shift lever to second neutral position for forward drive shifting.

These and other features of the invention will be more apparent from the following description and drawing of a preferred embodiment.

FIG. 1 is a partial side view of the transmission and shift linkage with parts in section.

FIG. 2 is a partial sectional view of FIG. 1 on the line 2—2 with the manual shift lever pivot in section.

FIG. 3 is an enlarged partial sectional view of FIG. 2 on the line 3—3 showing reverse inhibitor detail in inhibiting position.

FIG. 4 is a partial sectional view of FIG. 3 on the line 4—4.

FIG. 5 is a partial sectional view similar to FIG. 4 showing the inhibitor in non-inhibiting position.

FIG. 6 is a sectional view of FIG. 1 on the line 6—6 showing the inhibitor and release mechanism.

FIG. 7 is a diagram of the shift movement of the shift lever knob.

This transmission shift control linkage is employed to control a conventional transmission 10 mounted in a vehicle having a floor 11. The transmission 10 has conventional synchromesh gearing providing four forward speed drives and a reverse drive and has a conventional internal control linkage, not shown, of the type shown in U.S. Pat. No. 3,264,893 to T. C. F. Stott et al, granted Aug. 9, 1966, which has a shift shaft 12 mounted in the transmission housing 14 for rotary selecting movement between first, second and third neutral positions NI, NII and NIII and rearward axial shifting movement from the respective neutral positions to the reverse R, first speed 1 and third speed 3 positions and forward axial shifting movement from the second and third neutral positions respectively to the second speed 2 and the fourth speed 4 positions. Thus first neutral position is the reverse neutral position and second and third neutral positions are forward neutral positions respectively for first second and third fourth shifting. The internal shift linkage has detent means to resiliently hold the shift shaft in the second neutral position and stop means to limit movement at the end positions, first and third neutral positions and stop means to stop shifting movement at each drive position.

The shift shaft 12 extends into an external linkage cavity 16 having a sealing and securing ring 17 surrounding the opening 18 at the top portion of the transmission housing. The shaft 12 at the free end has a crank 21 secured to the shaft by a press fit pin 22. The crank 21 has a crank shaft 23 secured in eccentric parallel relation to shaft 12 and lug 24 is secured to the free end of the crank shaft 23 and lug 26 is formed as a portion of the crank to receive the tines 48 of shift fork 47 as described below. The shift path of the fork 47, crank 23 and shift shaft 12, when a centrally pivoted shift lever 46 is used, is reversed, that is the end first and third neutral positions are reversed on the neutral selection path and the drive speed are reversed about the neutral selection path.

The pivot support tower 27 is formed of a lower cylindrical member 28 and an upper cylindrical member 29 having respectively internal flanges 31 and 32 at the adjacent ends secured together by welding and having a central opening 33 for the manual shift lever 46. The lower cylindrical member 28 has at the lower edge an external securing flange 34 secured by screws 35 to the ring 17 of the transmission housing 14. The securing flange 34 is at an angle to the cylindrical member 28 so that the cylindrical wall of the members 28 and 29 forming tower 27 are positioned at an angle rather than vertically to position the shift lever assembly on the driver's side of the center of the transmission and vehicle. A plastic foam ring 36 is located around the tower 27 and abuts the underside of floor 11 to provide a sound and fume seal. A ball socket assembly 37 is located in the cylinder 29 and has a lower half socket member 38 and an upper half socket member 39 together providing a partial spherical socket 40 at the adjacent sides. The upper half socket member 39 is secured to cylindrical member 28 by a circular retaining clip 41 having portions projecting through apertures in the wall of member 29 into recesses in the socket member 39. A waved spring 42 is seated on the base flange 32 and engages lower half socket member 38 to bias it toward socket member 39, there being a small clearance space 49 between the socket members to cause the socket members to resiliently engage the ball 43 of the lower portion 44 of the manual shift lever assembly 46. The opening 33 is connected by a vent passage 45 consisting of a groove in the lower and outer surfaces of socket members 38, 39 and an aperture in the wall of cylindrical member 29. The lower portion 44 of the shift lever assembly is an integral member having the centrally located ball portion 43, a lower fork portion 47 which terminates in a pair of equal length legs or tines 48 straddling the crank shaft 23 and projecting between the lugs 24 and 26 on the crank shaft to transmit selecting and shifting movement between the shift lever assembly 46 and the shift shaft 12. The lower portion 44 of the shift lever assembly 46 has above the ball 43 an inhibitor housing portion 51 and a socket portion 52. The socket member 39 may have an internal groove 50 for clearance to facilitate assembly over the inhibitor assembly. A tubular intermediate lever portion 53 is secured by welding or brazing in the socket 52 and has an upper end portion 54 press fitted within a rubber sleeve 56 within the large portion 57 of the upper tubular lever portion 58. The intermediate lever portion 53, FIG. 6, is force fitted within the rubber sleeve 56 which is retained within the large portion 57 of upper lever portion 58 to provide a resilient connection between the intermediate and upper lever portions to isolate vibration and provide a substantially rigid connection for transmitting, selecting and shifting forces and movement. The upper lever portion 58 has a threaded end 59 having a longitudinal slot 61. A finger operated release member 62 has a sleeve portion 63 slidably fitting on the external cylindrical surface 64 of lever portion 58 and a finger grip portion 66 which the operator may lift with his fingers to release the inhibitor mechanism. The release member 62 has a connecting portion 67 extending through the slot 61 into the bore 68 in the tubular upper lever portion 58. The connecting portion 67 within the bore 68 has a slot 69 having a narrow entrance portion and an enlarged inner end portion to receive the shank 71 of the headed fastener portion 72 of the release rod member 73. The connecting portion 67 has an extension and spring abutment portion 70 with a space between connecting portion 67 and the abutment portion for a fastener head 72 and both portions having external surfaces fitting and guided in bore 68. The release member 62 and rod member 73 are one-piece moldings of a structural flexible polyamide polymer or a resin plastic material, i.e. nylon. The rod member 73 has an upper cylindrical portion 74 fitting in the bore 68 for sliding movement. The cylindrical portion 74 extends into the straight portion 76 of the bore in tubular lever portion 53. The rod member has an integral ball and link portion 77 in the curved bore portion 78 of intermediate lever 53. The ball and link portion 77 is formed integrally with cylindrical portion and consists of a series of integrally molded alternate balls 79 and thin connecting links 81 having sufficient flexibility to easily flex during relative reciprocating movement between the release rod member and tubular lever 53. The balls guide the release rod member in the bore portion 78 to prevent relative lateral movement. The release rod member 73 has integrally joined with the end link of the ball and link portion 77 at the lower end a locking portion 83 having a flattened cylindrical section, FIG. 3 and may have a metal sheath 84 to reduce wear with the metal inhibitor parts. The locking portion 83 thus has flat parallel sides and cylindrical ends. The cylindrical ends fit the cylindrical bore 85 in lever portion 44 to guid the locking portion for reciprocating movement with the main load during inhibiting on these cylindrical surfaces. The release mechanism is assembled by first snapping the shank 71 of headed fastener portion 72 of release rod member 73 into slot 69 of the connecting portion 67 of the release member 62. Then the release rod member 73 is fed though the bores 68, 76 and 78 into the inhibitor mechanism. The release member 62 slides over the threaded portion 59 of the upper lever 58 and the connecting portion 67 passes through the slot 61. A spring 86 is then positioned in bore 68 above the release member 62 and held in place by the hand knob 87 which is threaded on the threaded end 59 of the lever portion 58 and locked in place by the lock nut 88. A flexible sealing boot 90 seals the tower to the socket portion 52 of the shift lever 46.

The inhibitor detent mechanism 91 is located in the inhibitor housing portion 51 of the lower lever portion 44 and has an inhibitor member 92 having a cylindrical portion 93 mounted in a bore 94 transversely intersecting the bore 85 for transverse limited reciprocating movement in the same direction as the selecting movement of the shift lever 46. The inhibitor member is molded of a heat stabilized strong rigid fiberglass reinforced polyamide polymer type plastic material such as fiberglass reinforced type 66 nylon. The cylindrical portion 93 has a flat 96 cooperating with a flat portion 97 of the bore 94 to provide means to prevent rotation of the inhibitor member 92 in the bore 94 so that the locking opening 98 of inhibitor member 92 is aligned with the bore 85 when the inhibitor member 92 is in the inhibiting position. The locking member 83 has a beveled end 99 to ease entry of the locking member 83 into the locking opening 98 and locking opening 98 has an internal shape to fit the locking portion 83 to positively lock the inhibitor member 92 in inhibiting position as shown in FIGS. 3 and 4, whenever the shift lever assembly 46 is in second and third neutral positions NII or NIII and in the first through fourth forward speed drive positions. The inhibitor member 92 has a head portion 101 having a back side abutment surface 102 engaging inhibitor biasing spring 103 which at the other end engages abutment surface 104 of the housing 51. The head 101 has a skirt portion 106 surrounding and guiding the spring 103 and fitting with clearance in a large bore 107 in the housing 51. The housing 51 has an end stop surface 108 which normally does not contact the stop surface 109 on the upper ball socket member 39 in any position as shown at first neutral position, FIG. 5 and in second neutral position, FIG. 4. The head portion 101 has a rounded engaging surface 111 which has a small clearance relative to stop surface 109 in second neutral position NII and engages the stop surface 109 on selecting movement initially just beyond the second neutral position NII during movement from the second neutral position to the first neutral position NI. The biasing spring 103 biases the inhibitor member 92 into the inhibiting position shown in FIGS. 3 and 4 in which the C washer 112 secured in a slot in the end of the cylindrical portion 93 act as a stop engaging a stop surface 114 on the housing 51. The movement of the inhibiting member 92 from the inhibiting position, FIG. 4, is limited by movement of the shift lever assembly 46 from the second neutral position NII, FIG. 4 to the first neutral position NI, FIG. 5, which shift lever movement is limited by the internal linkage in the transmission.

Operation

Since the internal linkage controlled by shift shaft 12 has selecting and shifting movement detents and stops, the positions of the shift shaft 12, crank 23 and the shift lever assembly 46 are limited and determined as shown in FIGS. 1 and 2. In FIG. 2 the shift lever assembly 46 is shown in the normal second neutral position NII a detent position and may be moved to either side past the detent as indicated by the dot dash lines to the first neutral position NI or the third neutral position NIII, which are stop positions. FIG. 1 shows the shift lever assembly 46 in either of these neutral positions and the dot dash lines forward shifting movement from first, second and third neutral positions respectively to reverse R, first 1 and third 3 drive positions, or rearward shifting movement from second and third neutral positions respectively to the second 2 or fourth 4 forward drive positions. These selecting and shifting movement paths for the shift lever above the pivot ball 43 and thus at the inhibitor 91 and to a larger degree at the hand knob 87 are diagrammatically shown in FIG. 7. The selecting movement path is between the neutral positions and the shifting movement paths are transversely from the neutral positions to the drive positions. Thus, first neutral position is the reverse neutral position and the second and third neutral positions are forward neutral positions. During normal operation in second and third neutral position, NII and NIII and all forward drive positions, two through fourth, 1, 2, 3, 4 positions, the inhibitor biasing spring 103 biases the inhibitor member 92 to move the inhibitor member to the inhibiting position with stop washer 112 engaging stop surface 114 without contact between inhibitor head surface III and stop surface 109.

With the inhibitor member 92 in inhibiting position the locking opening 98 is aligned with bore 85 permitting release mechanism biasing spring 86 to bias the release rod member 73 so the locking portion 83 moves into the locking opening 98 to positively lock the inhibitor member 92 in inhibiting position as shown in FIGS. 3 and 4. The engaging surface III of inhibitor member 92 engages the stop surface 109 on the socket member 39 of tower support housing 27 on movement beyond second neutral position toward first neutral position. This positively prevents a shift from the second neutral position NII to first neutral position NI and thus prevents a shift to reverse drive position.

For shifting to reverse drive the operator lifts the finger release member 62 which lifts or pulls the pull release rod 73 and withdraws the locking member 83 from the locking opening 98 to free the inhibitor member 92 for movement from the positive inhibiting position FIG. 4 to permit shifting from the second neutral position NII to the first neutral position NI, FIG. 5. During the shift from the second neutral position to the first neutral position the shift lever assembly 46 must be moved against the bias of the inhibitor biasing spring 103. Thus the operator will feel the resistance of the biasing spring force and be advised that he is making this shift which is required before a shift to reverse drive can be made. When the lever assembly 46 has been moved substantially toward the first neutral position or is in the first neutral position, the operator may release the finger release member 62 and the biasing spring 86 will merely move the locking portion 83 downwardly into engagement with the top surface of the inhibitor member 92. Thus on a subsequent shift out of reverse into the first neutral position NI, the inhibitor biasing spring 103 will bias the shift lever assembly 46 from the first neutral position to the second neutral position to automatically restore the shift lever assembly 46 to the normal second neutral position. When the shift lever assembly 46 is in the second neutral position, the release mechanism biasing spring 86 moves the release mechanism 73 so that the locking portion 83 enters the locking opening 98 to re-establish positive inhibiting of a shift to reverse drive.

While some terms such as upper and lower have been used to describe the position of various parts on the drawing relative to the preferred embodiment shown in the drawing in one conventional position, it will be appreciated that this shift linkage may be used in other positions and that these words merely describe the relative position of the parts.

It will be appreciated that the invention described with reference to a preferred embodiment may be used in modified form.

It is claimed:
1. In a transmission shift lever control; a support; a shift lever pivotally mounted on said support for selecting movement between a forward neutral position and a reverse neutral position and shifting movement transverse to said selecting movement from said reverse neutral position to reverse drive position and from said forward neutral position to forward drive positions and inhibitor means having an inhibitor member mounted on said shift lever for limited reciprocating movement between inhibiting and noninhibiting positions in the same direction as said selecting movement and transverse to the longitudinal axis of the shift lever, inhibitor spring means to bias said inhibitor member to said inhibiting position and to permit return movement to said noninhibiting position, cooperating cam surface means on said inhibitor member and support in constant engagement between said forward and reverse neutral positions and in said reverse neutral position to permit free shifting of said shift lever between said forward neutral position and said forward drive positions and said inhibitor spring means resisting a manual shift of said shift lever from said forward neutral position to said reverse neutral position to resist a shift to reverse drive position and operative on a manual shift from reverse drive position to reverse neutral position to return said shift lever to forward neutral position.

2. In a transmission shift lever control; a support; a shift lever pivotally mounted on said support for selecting movement between a forward neutral position and a reverse neutral position and shifting movement transverse to said selecting movement from said reverse neutral position to reverse drive position and from said forward neutral position to forward drive positions and inhibitor means having an inhibitor member mounted on said shift lever for transverse limited reciprocating movement between inhibiting and noninhibiting positions in the same direction as said selecting movement, inhibitor spring means to bias said inhibitor member to said inhibiting position and to permit return movement to said noninhibiting position, cooperating cam surface means on said inhibitor member and support in constant engagement on movement from said forward neutral position toward said reverse neutral position and interlock means on said shift lever biased to locking position and normally positioned in locking position in forward neutral position and forward drive positions to lock said inhibitor member in inhibiting position operative to permit free shifting of said shift lever between said forward neutral position and said forward drive positions but to positively inhibit a shift from said forward neutral position to said reverse neutral position to prevent a shift to reverse drive position and manually movable to unlocked position to permit movement of said inhibitor member to permit a shift of said shift lever from forward neutral position to reverse neutral position against the bias of said inhibitor spring means for a shift to reverse drive position.

3. In a transmission shift lever control; a support; a tubular shift lever having a hand knob end, a pivot portion, and a transverse bore between said pivot portion and hand knob end and pivotally mounted on said support for selecting movement between a forward neutral position and a reverse neutral position and shifting movement transverse to said selecting movement from said reverse neutral position to reverse drive position and from forward neutral position to forward drive positions and inhibitor means having an inhibitor member with a locking opening mounted in said transverse bore in said shift lever for limited reciprocating movement between inhibiting and noninhibiting positions in the same direction as said selecting movement and transverse to the longitudinal axis of said shift lever, inhibitor spring means to bias said inhibitor member in the direction from said forward neutral position to said reverse neutral position to said inhibiting position and to permit return movement to said noninhibiting position, cooperating cam surface means on said inhibitor member and support in constant engagement between said forward and reverse neutral positions and in said reverse neutral position; said shift lever having a longitudinal axial bore intersecting said transverse bore and interlock means on said shift lever member having a release rod having a locking portion fitting said locking opening and reciprocally mounted in said axial bore, a finger release member mounted for movement externally on said shift lever and connected to said release rod and an interlock biasing spring mounted on said shift lever to bias said release rod and finger release member to locking position and operative in forward neutral position and forward drive positions to move said finger release member, release rod against said interlock biasing spring to locking position to position said locking portion in said locking opening to lock said inhibitor member in inhibiting position operative to permit free shifting of said shift lever between said forward neutral position and said forward drive positions but to positively inhibit a shift from said forward neutral position to said reverse neutral position to prevent a shift to reverse drive position, operative on manual movement of said finger release member and release rod to move said locking portion out of said locking opening to unlocked position to permit movement of said inhibitor member to permit a shift of said shift lever from forward neutral position to reverse neutral position against the bias of said inhibitor spring means for a shift to reverse drive position and operative on a shift of said shift lever from reverse drive position to first neutral position to permit said inhibitor spring means to move said shift lever to forward neutral position for forward drive shifting.

4. In a transmission shift lever control; a support; a shift lever pivotally mounted on said support for selecting movement and shifting movement transverse to said selecting movement; transmission shift control means having selecting movement between a first neutral position for reverse drive position and a second neutral position for first drive and second drive positions and shifting movement from said first neutral position to reverse drive position and from said second neutral position in opposite directions to either the first drive position or second drive position and inhibitor means having an inhibitor member mounted on said shift lever for transverse limited reciprocating movement between inhibiting and noninhibiting positions, spring means to bias said inhibitor member to said inhibiting position and to permit return movement to said noninhibiting position, cooperating cam surface means on said inhibitor member and support in constant engagement between said first and said neutral positions and in said first neutral and reverse positions of said shift lever and interlock means on said shift lever biased to interlock position and positioned in interlock position in second neutral, first drive and second drive positions to lock said inhibitor member in inhibiting position and manually movable to unlocked position to permit movement of said inhibitor member, operative to permit free shifting of said shift lever between said second neutral position and from said second neutral position to either first or second drive position but to positively inhibit a shift from second neutral position to first neutral position when said interlock means is in said interlock position and to permit a shift from second neutral position to first neutral position against the bias of said spring means when said interlock means is manually released to unlocked position to permit a shift to reverse drive position.

5. In a transmission shift lever control; a support; a tubular shift lever having a hand knob end, a pivot portion and a transverse bore between said pivot portion and said hand knob end and pivotally mounted on said support for selecting movement and shifting movement transverse to said selecting movement; transmission shift control means having limited selecting movement consecutively from a first neutral position for shifting to, reverse drive position through a second neutral position for shifting to forward first drive and second drive positions and to a third neutral position for shifting to forward third drive and fourth drive positions and shifting movement from said first neutral position to reverse drive position and from said second neutral position in opposite directions to either first drive position or second drive position and from said third neutral position in opposite directions to either third drive or fourth drive positions and inhibitor means having an inhibitor member with a locking opening mounted in said transverse bore in said shift lever for transverse limited reciprocating movement between inhibiting and noninhibiting positions in the same direction as said selecting movement and transverse to the longitudinal axis of said shift lever, inhibitor biasing spring means to bias said inhibitor member in the direction from said second neutral position to said first neutral position to said inhibiting position and to permit return movement to said noninhibiting position, cooperating cam surface means on said inhibitor member and support in constant engagement between said first and second neutral positions and in said first neutral and reverse drive positions of said shift lever; said shift lever having a longitudinal axial bore intersecting said transverse bore and interlock means on said shift lever having a release rod having a locking portion fitting said locking opening and reciprocally mounted in said axial bore, a finger release member mounted for movement externally on said shift lever and connected to said release rod and an interlock biasing spring mounted on said shift lever to bias and release rod and finger release member to interlock position in second neutral, first drive, second drive, third neutral, third drive and fourth drive positions to lock said inhibitor member in inhibiting position and manually movable to move said finger release member, release rod against said interlock biasing spring to locking position to position said locking portion in said locking opening to move to unlocked position to permit movement of said inhibitor member, operative to permit free shifting of said shift lever between said second and third neutral positions and from said second and third neutral positions respectively to either first or second and third or fourth drive positions but to positively inhibit a shift from second neutral position to first neutral position to prevent shifting to reverse drive position when said interlock means is in said interlock position and to permit a shift from second neutral position to first neutral position against the bias of said inhibitor spring means when said interlock means is manually released to unlocked position to permit a shift to reverse drive position.

* * * * *

UNITED STATES PATENT AND TRADEMARK OFFICE
CERTIFICATE OF CORRECTION

PATENT NO. : 3,998,110

DATED : December 21, 1976

INVENTOR(S) : Patrick H. O'Brien
Rizal J. Baysa

It is certified that error appears in the above-identified patent and that said Letters Patent are hereby corrected as shown below:

On the cover page at [54] delete "FOUR-SPEED MANUAL TRANSMISSION CONTROL".

Column 4, line 44, "guid" should read -- guide --.

Column 5, line 55, after "lines" insert -- indicate --.

Column 6, line 8, "III" should read -- 111 --.

Column 6, line 15, "III" should read -- 111 --.

Column 8, line 55, "said" should read -- second --.

Signed and Sealed this sixteenth Day of August 1977

[SEAL]

Attest:

RUTH C. MASON
*Attesting Officer*

C. MARSHALL DANN
*Commissioner of Patents and Trademarks*